United States Patent [19]
Öhlin

[11] Patent Number: 5,090,525
[45] Date of Patent: Feb. 25, 1992

[54] SHOCK ABSORBER ARRANGEMENT

[75] Inventor: Kenth Öhlin, Sollentuna, Sweden

[73] Assignee: Ohlins Racing AB, Sweden

[21] Appl. No.: 569,235

[22] Filed: Aug. 17, 1990

Related U.S. Application Data

[63] Continuation of Ser. No. 498,473, Mar. 22, 1990, abandoned, which is a continuation of Ser. No. 313,713, Feb. 22, 1989, abandoned.

[30] Foreign Application Priority Data

Feb. 22, 1988 [SE] Sweden .................. 8800602-8

[51] Int. Cl.⁵ ..................... F16F 9/18; B60G 11/26
[52] U.S. Cl. ................................ 188/319; 280/707
[58] Field of Search .............. 188/299, 319, 322.15; 251/30.02, 30.03, 30.05; 280/707, 714

[56] References Cited

U.S. PATENT DOCUMENTS

| | | | |
|---|---|---|---|
| 3,858,841 | 1/1975 | Haynes | 251/30.03 X |
| 4,732,408 | 3/1988 | Ohlin | 280/714 X |
| 4,796,662 | 1/1989 | Hoffmann et al. | 251/30.02 |
| 4,801,155 | 1/1989 | Fukushima et al. | 280/707 |
| 4,938,499 | 7/1990 | Kawabata | 280/707 |

FOREIGN PATENT DOCUMENTS 0173632  10/1982  Japan .............. 188/322.15

WO/85/046-98  10/1985  PCT Int'l Appl. .

Primary Examiner—Robert J. Oberleitner
Assistant Examiner—Peter M. Poon
Attorney, Agent, or Firm—Laff, Whitesel, Conte & Saret

[57] ABSTRACT

A shock absorber has an arrangement for bringing about different kinds of damping characteristics, in response to external controls (I) and independently of how the piston speed varies. The shock absorber comprises a piston which works in a cylinder (2) and which has a passage between upper and lower sides (1a, 1b) of the piston. The changes in the damping characteristics are obtained by a restriction in a channel through which a shock absorber medium or fluid flows. A first valve element (7) exerts an influence on the restriction in response to a first pressure which is created by means of a pilot flow running between the upper and lower sides at the piston. The pilot flow is determined by a second valve element (8) which is controllable by electrical control signal. The first valve element (7) comprises a spring-loaded, pressure-operated slide, the position of which is at every instant counterbalanced by the first pressure and a second pressure originating from the pressure differential existing between the upper and lower sides of the piston. The second valve element interacts with a proportional magnet which provides a setting of the first pressure that is independent of the variation in the piston speed.

23 Claims, 2 Drawing Sheets

SHOCK ABSORBER ARRANGEMENT

This application is a continuation of application Ser. No. 07/498,473, filed 3/22/90 now abandoned, which was a continuation of Ser. No. 07/313,713 filed 2/22/89, now abandoned.

BACKGROUND OF THE INVENTION

1. Field of the Invention

The invention relates to shock absorbers and more particularly to arrangements for bringing about different kinds of damping characteristics in a shock absorber.

The damping characteristics are determined by controls, independently of variations in any parameter which seeks to change the set damping effects, in an undesirable manner. For example, such a parameter might be constituted by the shock absorber's piston speed, which causes a speed dependent variation. The shock absorber comprises a piston/piston rod working in a fluid medium in the cylinder of the shock absorber. Moreover, the shock absorber works with a servo function, in which a first valve element carries out a determination of the size of a restriction in a principal medium flow between the upper and lower sides of the piston depending on a first pressure produced by means of a pilot medium flow ("pilot flow") running between the upper and lower sides which is determinable with a second valve element that is controllable by the controls.

2. Prior Art Statement

A hydraulic amplifier arrangement is previously known in association with electronically controllable shock absorbers. A control of a restriction determines the damping effect which may be carried out with proportionately small control signals. Thus, a small mass can be used in the element for controlling the function, which means that the system can work with small inductances. Reference is made to patent application PCT/SE85/00120 (WO 85/04698), which relates to an arrangement which permits changes in the damping characteristic during one and the same piston stroke.

The known arrangements for such control require comparatively complicated control equipment, in the form of micro-computer equipment, for example, and the necessary software.

However, there is a requirement for applications in which the control function for the damping characteristics of the shock absorber can be simplified while maintaining high demands on the controllable damping function. It must be possible, for example, to obtain uniform damping effects within the entire adjustment range by the use of simple settings of a potentiometer, pressure in a suspension system, speed monitoring elements, injection pumps, etc. It should also be possible to carry out adjustments in a stepless manner, if it is so desired.

In addition, there is a requirement that it is possible to give the shock absorber a simple and reliable construction. It must not be possible, for example, for variations in existing parameters, such as the piston speed, to influence the set damping characteristic. It must also be possible for the arrangement to function with small controls and weak control signals, i.e. with an amplifier/servo function.

SUMMARY OF THE INVENTION

According to the invention, the problems stated above are solved by the functions which determine the damping characteristic working with two combined adjustment systems. One system is operated with the controls for the pilot flow. The other is a self-regulating system for the principal medium flow.

The inventive arrangement has, among other things, a first valve element comprising a member, preferably in the form of a movable slide, the position of which is in every instance counterbalanced by a first pressure produced by means of the pilot flow. A second pressure is originated from the pressure difference existing between the upper and lower sides of the piston. A second valve element includes or interacts with a proportional magnet which influences (for example, holds constant) the first pressure independently of the variation in the parameters (piston speed, for example).

Preferably a movable member in the form of a spring-loaded pressure-operated slide is used. The force of the spring acts on the member/slide in the same direction as a first force, caused by the first pressure, acting on the member/slide. Thus, the member/slide is counterbalanced by a force, which is composed of the spring force and the first force, and by a second force on the member/slide which is caused by the second pressure.

In a preferred embodiment, the member/slide is exposed to the first and second pressures via its end surfaces and is provided with a lateral recess for conducting the principal medium flow in both directions. Preferably, the slide is provided with a channel which connects the pressure spaces for the first and second pressures and via which the pilot flow runs in the direction from the pressure space for the second pressure to the pressure space for the first pressure. The second valve element preferably works towards a seat in a passage between the pressure space for the first pressure and a further space which is connected via first and second check valves with the upper and lower sides of the piston. The space for the second pressure is connected with the upper and lower sides of the piston via third and fourth check valves. In this manner, a pilot flow running from the upper side of the piston to its lower side acts via the third check valve, the channel in the member/slide, the seat passage and the second check valve. The pilot flow from the lower side of the piston to its upper side is conducted via the fourth check valve, the channel in the member/slide, the seat passage and the first check valve.

An electric control signal is supplied to the proportional magnet to bring about an armature force, referred to herein as a "third force", in the armature of the proportional magnet. The third force is directed toward a fourth force which is caused by the pilot flow, counterbalanced by the first pressure. The second valve element is pressed at its valve seat towards the pilot flow in response to the armature force.

With the inventive arrangement, it is preferable for uniform damping effects to be obtained within the entire adjustment range, which can be large with regard to the piston speed parameter (which may be a range of 0.05–4.00 m/sec, for example). The control unit used for controlling the shock absorber can be comparatively simply constructed. Preferably, a stepless control is used within the adjustment range.

DESCRIPTION OF THE DRAWINGS

Reference is made to the attached drawings, in which.

DESCRIPTION OF PREFERRED EMBODIMENT

Figure 1:
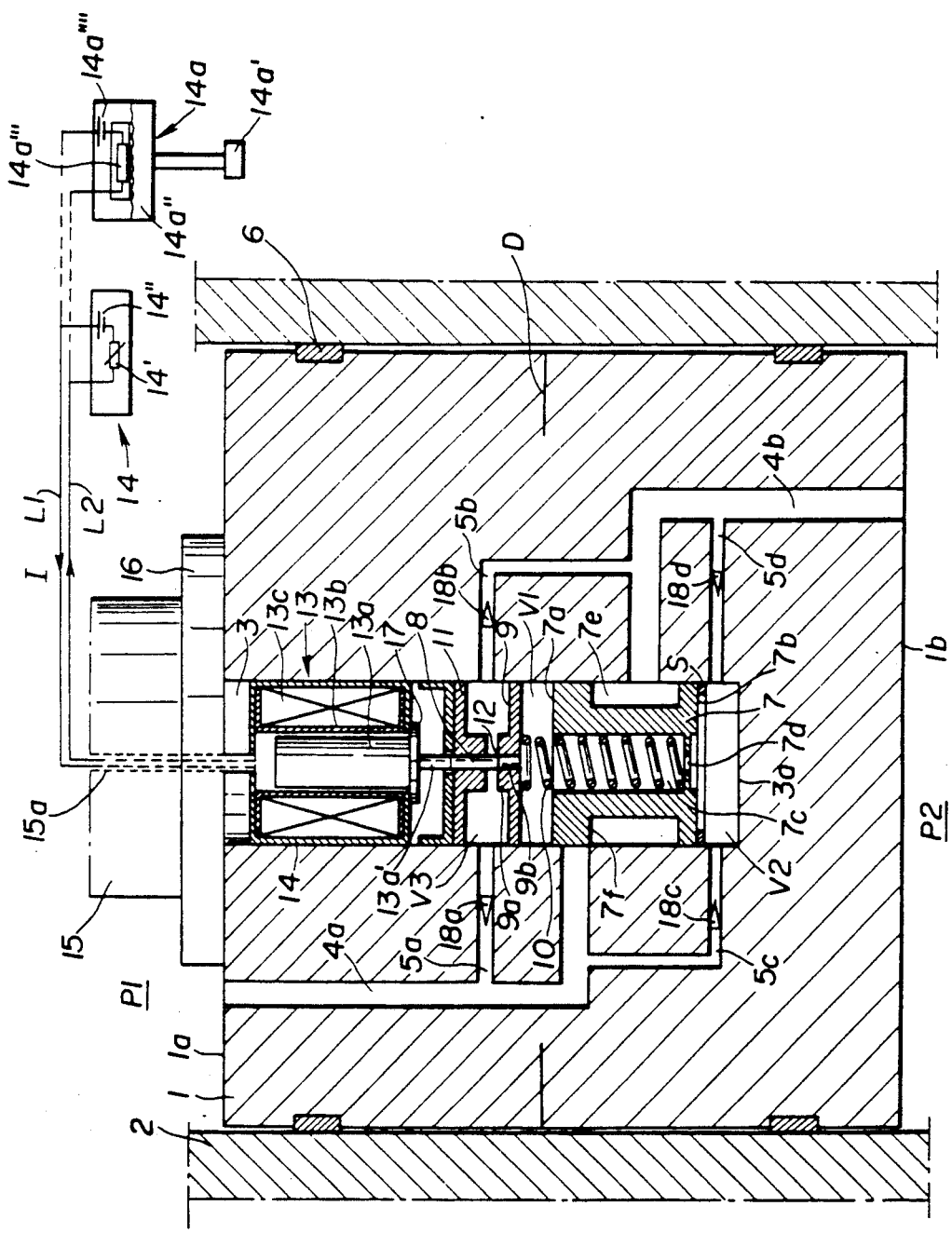
FIG. 1 shows in vertical section and in principle a piston provided with elements for controlling the damping characteristic.

The shock absorber can have a basic construction which is known per se, such as, for example, that described in the aforementioned PCT application. The piston and cylinder of the shock absorber are designated 1 and 2 respectively. The piston 1 is provided with an internal bore 3.

The piston works in a medium such as, for example, hydraulic oil or a similar fluid or emulsion of gas/fluid. The pressure on the upper side 1a of the piston has been designated P' and the pressure on the lower side 1b of the piston has been designated P''. The piston is provided with channel sections 4a, 4b for a principal medium flow between the upper and lower sides. The piston is also provided with channel sections 5a, 5b, 5c, 5d for a pilot medium flow between the upper and lower sides. The channel sections 5a-5d are connected to the channel sections 4a, 4b, but may alternatively run directly into spaces at the upper and lower sides.

The piston is sealed against the cylinder wall with conventional sealing elements and in a known manner. The piston consists of two or more sections joined together via a dividing line D, at which the piston sections are joined together in any suitable and known manner, as with screws, adhesive, etc. For the sake of clarity, the channels are shown in a common plane; however, in the practical embodiment, they are located in different vertical sections in the piston. The dividing line has, therefore, not been drawn in full.

In the space 3, a first valve element 7 and a second valve element 8 are arranged. The first valve element 7 is in the form of a dynamically balanced, spring-loaded, pressure-operated slide, shown in its lower end position. The slide works between two spaces V1 and V2 which are varied as the slide moves. The lower end has an element for determining the end position. For example, a ring S is permanently fixed on the inner wall at the bottom of the piston. The space 3 is provided with a first fixed internal wall 9 which together with the slide end surface 7a delimits the space V1. The bottom 3a of the space 3, together with the slide end surface 7b delimits the space V2. The slide has an insertion hole 7c for receiving a spring 10 which is inserted between the bottom of the insertion hole 7c and the internal wall 9. The slide has an opening 7d connected to the insertion hole in order to obtain a connection/channel between the spaces V1, V2.

The slide 7 is provided with an annular lateral recess 7e for conducting the principal medium flow in both directions, between the upper and lower sides 1a and 1b of the piston. The slide 7 also has a first restriction/restricting edge 7f.

The second valve element 8 is mounted for longitudinal movement in a second fixed internal wall 11 in the space 3. The valve element works towards a seat 9a in the first fixed internal wall 9. The seat forms an integral part of a passage 9b in the wall 9. Via a second restriction 12 formed by the element 8 and the seat, the passage 9b connects the space V1 with a third space V3. The element 8 is in the form of a needle/pin (with 2-3 mm diameter, for example). Its end surface 8a has an area which is hereinafter referred to as the "needle area".

The valve element 8 forms an integral part of or interacts with a proportional magnet 13 which is in the space 3. The magnet includes an armature 13a, which is connected or interacts with the needle or pin 8. The interaction between armature and pin 8 takes place via a peg or contact part 13a' on the armature. The magnet includes a bobbin having a winding case 13b and a winding 13c.

The bobbin is surrounded by an iron cover 14 arranged to amplify the magnetic field which is produced by the proportional magnet when an electric signal I is supplied to the winding 13c. The control signal I is supplied via electrical conductors L1 and L2 which connect the windings to external control elements 14, 14a. The wires are arranged in a channel 15a inside the piston rod 15. The channel forms a gastight connection in relation to the surroundings of the shock absorber. The piston rod is fixed in the piston in any suitable and known manner with a threaded fixing element 16. The transfer of wires between the movable piston and the fixed external connections for the wires L1 and L2 can be carried out in any suitable and known manner.

The mass of the needle and the armature is small. Thus, the proportional valve can work with small inductances, giving quick changes in response to the control signal, if so required. The armature 13a can be given a starting position defined by the stop 17, which position corresponds to the position according to FIG. 1. In this starting position the element has completely closed the seat 9a.

The control element 14, 14a can have a comparatively simple construction. With the control element 14, a setting can be carried out by means of a potentiometer 14' which can be manually operable, controlled from a speedometer, injection pump, etc. The control can be carried out in a stepless manner. With control element 14a, the control can be effected in response to a pressure, such as an air brake pressure, for example, delivered from a source 14a' which, via a bellows 14a'', operates an element 14a''' which transforms pressure into an electric signal corresponding to the respective pressure value. The electricity supply can come from an electricity supply source, for example, a battery 14 or 14a'''' respectively.

Figure 2:
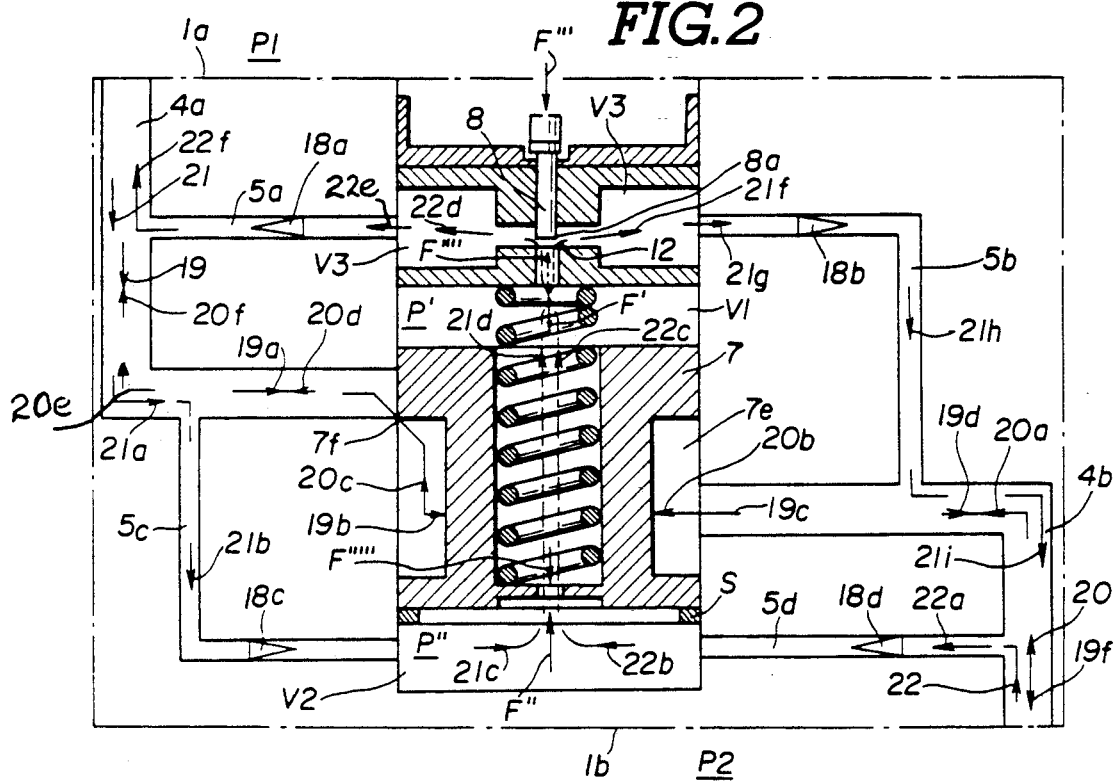
FIG. 2 is a vertical section showing parts of FIG. 1, where the acting medium flow paths and forces are given.

Check valves 18a, 18b, 18c and 18d are arranged in the pilot channel sections 5a, 5b, 5c and 5d, respectively. According to FIG. 2, the principal medium flow can be conducted in the direction of the arrows 19a, 19b, 19c to 19f from the upper surface 1a to the lower surface 1b of the piston. The passage leads via the channel section 4a, the restriction 7f, the recess 7e, and the channel section 4b. The principal medium flow can be conducted from the lower side 1b to the upper side 1a in the direction of the arrows 20, 20a, 20b to 20f, i.e. opposite to the direction given above.

The pilot flows are conducted along different routes. When the pressure P1 is higher than the pressure P2, a first pilot flow is conducted in the direction of the arrows 21, 21a, 21b to 21d and 21f to 22i. In this case, the passage leads via the channel section 4a and into channel section 5c, via check valve 18c, the space V1, the thoroughfare in the slide 7, the restriction 12, the check valve 18b into the channel section 5b, and further out into the channel section 4b. In a case where the pressure P2 is greater than the pressure P1, a second pilot flow is formed in the direction of the arrows 22, 22a, 22b to 22f. In this case, the passage is via the channel section 4b and into the channel section 5d, the check valve 18d, the thoroughfare in the slide 7, the restriction 12, the space V3, the check valve 18a and into the channel section 5a and further out into the channel section 4a to the aforementioned upper side 1a.

In the space V1, there is a pressure P' which is defined by the valve element 8 and which gives rise to a force F' distributed along the end surface 7a. In the space V2, there is a pressure P" which is related to the pressure difference between the pressures P1 and P2 on the upper and lower sides of the piston. The pressure P" works towards the end surface 7b of the piston and produces a force F" which is distributed along the end surface 7b of the slide. The armature force in the proportional magnet is caused by the control signal indicated as F'''. The respective pilot flow 21, 21a, 21b to 21i/22, 22a, 22b to 22f gives rise to a force F'''' which is directed towards the force F'''. The force F' combines with the spring force F''''' and is directed towards the force F".

While the adjustment function is in progress, the pressure P' in the space V1 is determined by the ratio of the armature force F''''/area (needle area) of 8a. The proportional magnet provides an armature force determined by the set control signal I and furthermore allows its armature to be moved positionally, despite the control signal supplied. Thus, the element 8 can carry out longitudinal movements, toward or away from the seat 9a, depending on changes in the pressure P'. When the pressure tends to increase or decrease, the element can move in a direction away from or toward the seat 9a (FIG. 1), respectively, so that the pressure P' assumes a value at all times which corresponds to the control signal. Thus, the pilot flow is at all times counterbalanced by the pressure P' in the space V1. The element 8 (the armature) stands (or rides) on the pilot flow at the seat 9a and is pressed towards the pilot flow by the armature force.

The above described balance of forces means that a variation in a shock absorber parameter (the piston speed, for example) can be overcome so that it is prevented from having undesirable effects on the damping functions. The adjustment functions can be arranged so that the damping functions remain independent of the parameter in question, over the entire adjustment range. Or, alternatively, adjustments may be made dependent in a predetermined manner and within the adjustment range.

A changed control signal (i.e. another value of control signal I) gives rise to a corresponding change in the ratio armature force F'''/needle area. The pressure P' assumes a new value which corresponds to the change and which is then retained or changed in a predetermined manner within the entire adjustment range, independently of variations in the parameter in question, and so on.

The pressure P' is also utilized for the servo function carried out with the slide 7. The position of the slide 7 is defined by the pressures P' and P", pressure P' being settable in accordance with the pressure and P" being defined by the pressure difference then existing between the upper and lower sides of the piston (i.e. by P1-P2 or P2-P1). The restriction 7f of the principal flow is dependent upon the position of the slide which is defined by the aforementioned pressures P' and P".

A change in the piston speed, for example, results in tendencies to change the pressure difference between the upper and lower sides of the piston and thus to change the pressure P". The self-regulating function of the slide 7 causes the size of the restriction to be changed by means of a movement of the slide.

The change in the size of the restriction has an effect which counteracts the tendencies of the pressure difference to change between the upper and lower sides of the piston. The pressure P" is maintained at its assumed value. The movement of the slide in the regulating function for the principal flow causes tendencies to change in the set pressure P' within the space V1. The latter tendencies are, in turn, counteracted in the manner stated above and so on.

It is clear that the damping ability can be changed continuously in response to a varied control signal. The new arrangement can also work with rapid changes in the control signal. In trucks or lorries, for example, even in heavy ones, it may be appropriate to increase the degree of shock absorption with increased truck speed and vice versa. The shock absorber can thus be controlled by a speed monitoring element on the vehicle. The shock absorption ability can also be changed according to the load, for example, in buses and the like where control information can be sensed by an air-controlled suspension.

The new shock absorber can also be used with equipment other than vehicles, since the shock absorber can be used wherever vibrations of a mass are to be damped.

Figure 3:
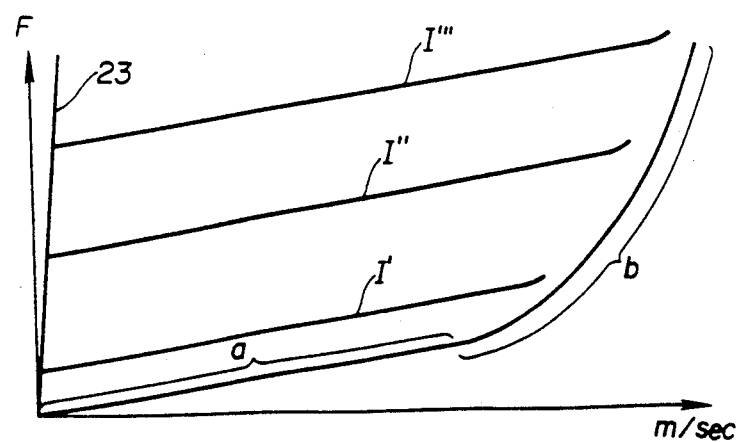
FIG. 3 shows in diagram form the force and piston speed curves for different sizes of the control signal within the adjustment range.

FIG. 3 exemplifies damping characteristics within the adjustment range of the shock absorber. The adjustment range is limited by a straight line 23 in the left section of the range. This line exists as a result of leakage between the piston and the cylinder. The angle between the vertical line for the force F and the limiting line 23 has been shown as exaggeratedly large for the sake of clarity.

At the bottom and toward the right, the adjustment range is limited by a limiting line which is similarly shown at an exaggerated large angle with regard to the X axis. This limiting line includes a straight section "a" and a curved section "b". The straight section "a" is defined by the C constant in the spring 10. Section "b" is defined by saturation in the valve function.

The graph lines or curves of FIG. 3 show an example in which the restrictions 7f and 12 are influenced. According to the invention, uniform damping characteristics are advantageously obtained within the adjustment range. The line I' is parallel to the limiting line "a" and shows the damping characteristics which are obtained for a current of approximately 200 mA. The curves I" and I''' correspond to control signals of 400 mA and 600 mA respectively.

The adjustment range can be kept large with regard to the piston speed variations despite the controllability of the shock absorber which the invention provides. The uniform damping characteristics of the shock absorber can, for example, be effective within a piston speed range as large as 0.05-4.00 m/sec.

The invention is not limited to the embodiment given as an example above, but can be subjected to modifications within the scope of the following patent claims and the inventive concept.

What is claimed is:

1. A control system for a shock absorber, said shock absorber having a piston/piston rod working in a cylinder filled with a flowable medium, said piston having upper and lower sides coupled by a pilot flow of said medium, said system comprising a first valve means for determining a size of a restriction to a principal flow of said medium between said upper and said lower sides of the piston, a second valve means responsive to said pilot flow for producing a first pressure space (P') for operating said first valve means, the first valve means having a position which is constantly in counterbalance between said first pressure space (P') and a second pressure space (P") which is the differential (P1-P2; P2-P1) in the pressure between a space at an upper side (P1) and a space at lower side (P2) of said piston, and a proportional magnet associated with said second valve means for holding a constant pressure in the first pressure space (P') independently of any variations in parameters of said shock absorber.

2. The system of claim 1 wherein said first valve means is a slide.

3. The system of claim 1 wherein said first valve means comprises a spring having a spring force (F''''') acting in the same direction as a first force (F') resulting from said first pressure (P'), said first valve being counterbalanced by a force composed of said spring force (F''''') , the first force (F'), and a second force (F") resulting from said second pressure (P").

4. The system of claim 3 and means for supplying a control signal to said proportional magnet, said magnet having an armature to cause a third force (F''') directed toward a fourth force (F'''') caused by said pilot flow at said second valve means, said pilot flow being counterbalance by said first pressure (P') and the armature force (F''') acting on said second valve means.

5. The system of claim 1 wherein said first valve means is a slide having a channel which interconnects the spaces where said first (P') and second (P") pressures appear, said pilot flow running in a direction from the second (P") to the first (P') pressure.

6. The system of claim 1 wherein said second valve means has a seat in a passage way between said space where said first pressure (P') appears and another space, first and second check valves for respectively coupling said other space to said spaces above and below the upper and lower sides of said piston.

7. The system of claim 6 and third and fourth check valves, means for coupling said space where said second pressure (P") appears to said spaces above and below the upper and lower sides of said piston, said coupling being via said third and fourth check valves.

8. The system of claim 7 wherein said first valve means is a slide means having a channel therein; said pilot flow running in a direction from said upper side to said lower side via said third check valve, said channel, a seat for said first valve means, and said second check valve; and said pilot flow running in a direction from said lower side to said upper side via said fourth check valve, said channel, said seat, and said first check valve means.

9. The system of claim 1 wherein said shock absorber has a uniform damping characteristic over an entire range of adjustments which is a large range relative to the speed at which said piston operates.

10. The system of claim 9 wherein said shock absorber responds to said control signal in a stepless manner.

11. A control system for a shock absorber, said shock absorber having a piston/piston rod working in a cylinder filled with a flowable medium, said piston having upper and lower sides coupled by a pilot flow of said medium, said system comprising a first valve means for determining a size of a restriction to a principal flow of said medium between said upper and said lower slides of the piston, a second valve means responsive to said pilot flow for producing a first pressure space (P') for operating said first valve means, the first valve means having a position which is constantly in counterbalance between said first pressure space (P') and a second pressure space (P") which is the differential (P1-P2; P2-P1) in the pressure between a space at an upper side (P1) and a space at a lower side (P2) of said piston, and a proportional magnet associated with said second valve means for holding a constant pressure in the first pressure space (P') independently of any variations in parameters of said shock absorber, said first valve means having a recess for conducting said principal flow, said first (P') and second (P") pressures being exposed to opposing end surfaces of said first valve.

12. An arrangement for controlling a shock absorber under different kinds of damping conditions, which change the set damping effects in an undesirable manner, the shock absorber comprising a piston/piston rod working in a medium filled cylinder, a first valve element for determining the size of a restriction in a principal medium flow between upper and lower sides of the piston, a first pressure (P') produced by means of a pilot flow running between upper and lower sides of the piston, a second valve element, the first valve element comprising a member in the form of a movable slide, the position of which is always counterbalanced by the first pressure (P') and a second pressure (P") originating from a pressure difference (P1-P2; P2-P1) existing between upper and lower sides of the piston, and the second valve element including a proportional magnet which influences the first pressure (P') independently of operational variations of the shock absorber.

13. The arrangement according to claim 12, and an integral part for counterbalancing the slide comprising a spring having spring force (F''''') which acts on the slide in the same direction as a first force (F') caused by the first pressure (P'), the position of the slide being counterbalanced by a force, which is composed of the spring force (F''''') and the first force (F'), and a second force (F") which is caused by the second pressure (P").

14. The arrangement according to claim 13 wherein the slide is exposed to the first and second pressures (P', P") via its end surfaces and is provided with a lateral recess for conveying the principal medium flow.

15. The arrangement according to claim 14 wherein the slide has a channel which interconnects first and second pressure spaces (V1, V2) in which the first and second pressures (P'), (P") appear and via which the pilot flow runs in the respective direction from the second pressure space (V2) for the second pressure (P"), to the first pressure space (V1) for the first pressure (P').

16. An arrangement for controlling a shock absorber under different kinds of damping conditions which change the set damping effects in an undesirable manner, the shock absorber comprising a piston/piston rod working in a medium filled cylinder, a first valve element for determining the size of a restriction in a principal medium flow between upper and lower sides of the piston, a first pressure (P') produced by means of a pilot flow running between upper and lower sides of the piston, a second valve element, the first valve element comprising a member in the form of a movable slide, the position of which is always counterbalanced by the first pressure (P') and a second pressure (P'') originating from a pressure difference (P1-P2; P2-P1) existing between upper and lower sides of the piston, said second valve element including a proportional magnet which influences the first pressure (P') independently of operational variations of the shock absorber, an integral part for counterbalancing the slide comprising a spring having spring force (F''''') which acts on the slide in the same direction as a first force (F') caused by the first pressure (P'), the position of the slide being counterbalanced by a force which is composed of the spring force (F''''') and the first force (F'), and a second force (F'') which is caused by the second pressure (P'') the slide being exposed to the first and second pressures (P', P'') via its end surfaces and having a lateral recess for conveying the principal medium flow, the slide having channel which interconnects first and second pressure spaces (V1, V2) in which the first and second pressures (P'), (P'') appear and via which the pilot flow runs in the respective direction from the second pressure space (V2) for the second pressure (P''), to the first pressure space (V1) for the first pressure (P'), the second valve element working toward a seat in a passage between the first pressure space (V1) for the first pressure (P') and a third pressure space (V3) which is connected via first and second check valves with the first and second spaces above and below the upper and lower sides of the piston respectively.

17. The arrangement according to claim 16 wherein the space (V2) for the second pressure (P'') is connected to the spaces above and below the upper and lower sides of the piston via third and fourth check valves.

18. The arrangement according to claim 17 wherein the pilot flow runs from the space above the upper side of the piston to the space below the lower side via the third check valve, the channel in the slide, the seat passage, and the second check valve and wherein the pilot flow runs from the space below the lower side of the piston and the space above the upper side of the piston via the fourth check valve, the channel in the slide, the seat passage, and the first check valve.

19. The arrangement according to claim 18 and control means for supplying an electric control signal (I) to the proportional magnet to cause an armature force (F'''), said third force (F''') being directed toward a fourth force (F'''') caused by the pilot flow acting on the second valve element, the pilot flow being counterbalanced by the first pressure (P'), the armature force pressing the second valve toward the pilot flow at the seat.

20. A control system for a shock absorber, said shock absorber having a piston/piston rod working in a cylinder filled with a flowable medium, said piston having upper and lower sides coupled by a pilot flow of said medium, said system comprising:
 a first valve means for determining a size of a restriction to a principal flow of said medium between said upper and said lower sides of the piston;
 a second valve means responsive to said pilot flow for producing a first pressure (P') for operating said first valve means;
 the first valve means having a position which is constantly in counterbalance between said first pressure (P') and a second pressure (P'') which is the differential (P1-P2; P2-P1) in the pressure between the upper side (P1) and the lower side (P2) of said piston; and
 a proportional magnet associated with said second valve means for holding the first pressure (P') constant independently of any variations in perimeters of said shock absorber;
 said first valve means being a slide having a channel which interconnects spaces where said first (P') and second (P'') pressures occur, said pilot flow running in a direction from the second (P'''') to the first (P') pressure via said channel,
 said second valve means having a seat in a passageway between a space where said first pressure (P') occurs and another space, first and second check valves for respectively coupling said other space to spaces above and below the upper and lower sides of said piston, third and fourth check valves coupling a space where said second pressure (P'') occurs to said spaces above and below the upper and lower sides of said piston, said coupling being via said third and fourth check valves,
 whereby said pilot flow runs in a direction from said upper side to said lower side via said third check valve, said channel, a seat for said first valve means, and said second check valve;
 and whereby said pilot flow runs in a direction from said lower side to said upper side via said fourth check valve, said channel, said seat, and said first check valve means.

21. The system of claim 20 wherein said slide includes a spring having a spring force (F''''') acting in the same direction as a first force (F') resulting from said first pressure (P'), said slide being counterbalanced by a force composed of said spring force (F'''''), the first force (F'), and a second force (F'') resulting from said second pressure (P'').

22. The system of claim 20 wherein said slide has a recess for conducting said principal flow, and said first (P') and second (P'') pressures are exposed to opposing end surfaces of said slide.

23. The system of claim 22 and means for supplying a control signal to said proportional magnet, said magnet having an armature to cause a third force (F''') directed toward a fourth force (F'''') caused by said pilot flow at said second valve means, said pilot flow being counterbalanced by said first pressure (P') and the armature force (F''') acting on said second valve means.

* * * * *